Fig. 1.

INVENTOR.
JOHN F. REEVES
BY
ATTORNEYS

Fig. 2.

INVENTOR.
JOHN F. REEVES
BY
Kenyon & Kenyon
ATTORNEYS

July 25, 1961 J. F. REEVES 2,993,822
REINFORCED PLASTIC MOLDING PROCESS
Filed May 23, 1957 6 Sheets-Sheet 5

Fig. 8

INVENTOR.
JOHN F. REEVES
BY
ATTORNEYS

United States Patent Office 2,993,822
Patented July 25, 1961

2,993,822
REINFORCED PLASTIC MOLDING PROCESS
John F. Reeves, Green Village, N.J.
Filed May 23, 1957, Ser. No. 661,105
7 Claims. (Cl. 154—110)

This invention relates to a reinforced plastic molding process.

Modern plastics require reinforcing to provide them with additional structural strength. This reinforcing is a porous material because of the desirability of impregnating the reinforcing material with the plastic so as to secure what might be called a homogeneous molding. Because of this, prior art reinforced plastic molding processes have resorted to pre-impregnation of the reinforcing material with the plastic, possibly followed by the use of additional plastic in the mold which must be used to provide the desired shape. For the same reasons such processes have suggested the forcible driving or squirting of the plastic through the porous material. The latter idea has the advantage that the porous material may be pre-arranged in the mold but has the disadvantage that the hydraulic pressure required to force or squirt the plastic through the porous material dislodges the latter from its pre-arranged position in the mold. The first mentioned type of process is both messy and slow.

Because of these prior art limitations it was commercially impossible prior to the present invention to produce large reinforced plastic objects. It was, for example, impossible to produce large automobile truck bodies, automobile tractor trailer tanks and similar objects.

The object of the present invention is to eliminate these prior art limitations and to permit the production of reinforced plastic objects of any size and to do this in a manner permitting commercial operations on a large scale and so as to be advantageously competitive with other methods of construction involving the use of metal framing, sheets and the like. Successful attainment of this object requires the production of any size of object, such as the truck bodies and trailer tanks mentioned above, with the reinforcing positioned in a predetermined manner where it is required to carry the structural stresses and so that there are no stress areas which are unduly resin rich or having unfilled voids or the like. The present invention has now met all of these requirements successfully in the experimental production of a fairly large number of automobile tractor trailer tanks of the milk transport type, and also in the production of truck refrigerator bodies. These products have been tried out under severe service conditions and have operated successfully. Their cost of manufacture, using the present invention, permits successful competition with standard constructions of the metal type.

Other objects successfully achieved by the present invention will be come apparent from the following disclosure of the invention as it has been practiced in making the trailer tanks in particular, it being understood that the same principles are applicable to many other constructions. The present application is a continuation-in-part of an original application filed November 24, 1953, and bearing Serial No. 394,177, now abandoned, where the fundamental principles of this invention were disclosed and claimed.

Referring now to the accompanying drawings:

FIG. 6 is in effect a cross section of the reinforced molding components showing how they are assembled;

In these drawings the mold assembly is shown as comprising a lower mold 1 forming an upwardly open cavity 2 and a movable upper mold 3 which may be inserted and moved downwardly into the cavity 2 to a closed position defining a molding enclosure space contoured as required by the design of the trailer tank. It can be seen that the drawings show the molding of an extremely large object, the lower mold 1 actually used in successfully reducing the present invention to practice in the illustrated instance, being over 32 feet long.

The lower mold 1 is made with a smooth inside formed by a sheet metal skin 4 supported by a strong framework. This framework includes structural steel tension members 5 extending upwardly from steel saddle members 6. The upper ends of the tension members 5 connect with a series of strong horizontal pins 7 mounting the eyes of large eye bolts 8 which can be swung upwardly above the upper level of the lower mold 1. The arrangement is such as to provide a large number of the bolts 8 at relatively closely spaced distances apart and forming a series extending along each long side of the lower mold 1.

The upper mold 3 has a smooth outside formed by a metal skin 9 supported internally by steel compression members 10 which extend upwardly to a strong framework formed by a large number of transversely extending structural steel beams 11 having ends located to overlie the bolts 8 and formed with apertures 12 through which these bolts 8 may be passed. Nuts 13 screwed on the upper ends of the bolts 8 are used to force the upper mold 3 into the lower mold 1 to effect complete closing of the mold assembly.

A gutter surrounds the entire top edge of the lower mold 1 providing the cavity 2. This gutter has a substantially horizontal bottom 14 which is flush with the upper peripheral edge of the skin forming the cavity 2. This horizontal bottom extends transversely outwardly away from the cavity for a substantial distance. In making the trailer tank the bottom 14 was 3½ inches wide as viewed in FIG. 5. Outwardly beyond this bottom 14 the gutter has an upstanding wall 15. Inwardly with respect to the cavity 2 the gutter has no wall, the gutter's bottom 14 being entirely open horizontally with respect to the cavity 2.

In a trailer tank intended for milk transport service there are health or sanitary laws which make it mandatory for the interior of the tank to be made of stainless steel. Also, the tank must be thermally insulated. In making such a tank from reinforced plastic these considerations must be kept in mind.

Figure 1:
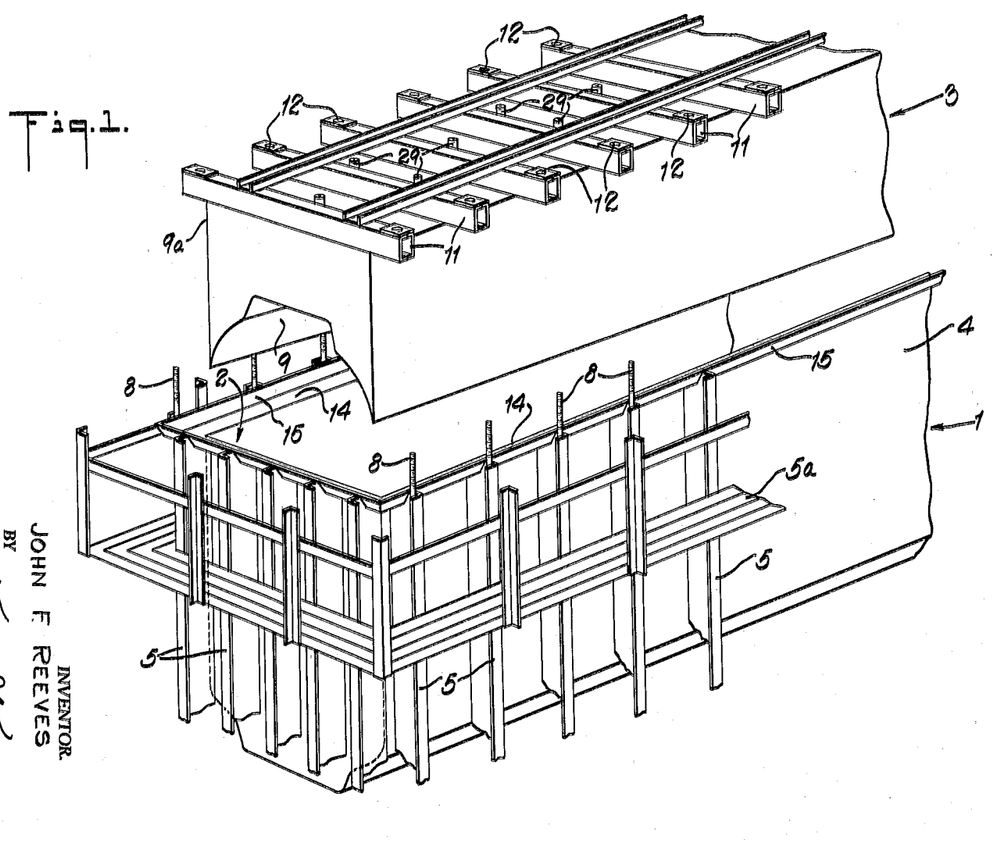
FIG. 1 shows the mold assembly for the trailer tanks, this being a perspective view of an end portion only with the upper mold of the assembly suspended above the lower mold.
Figure 2:
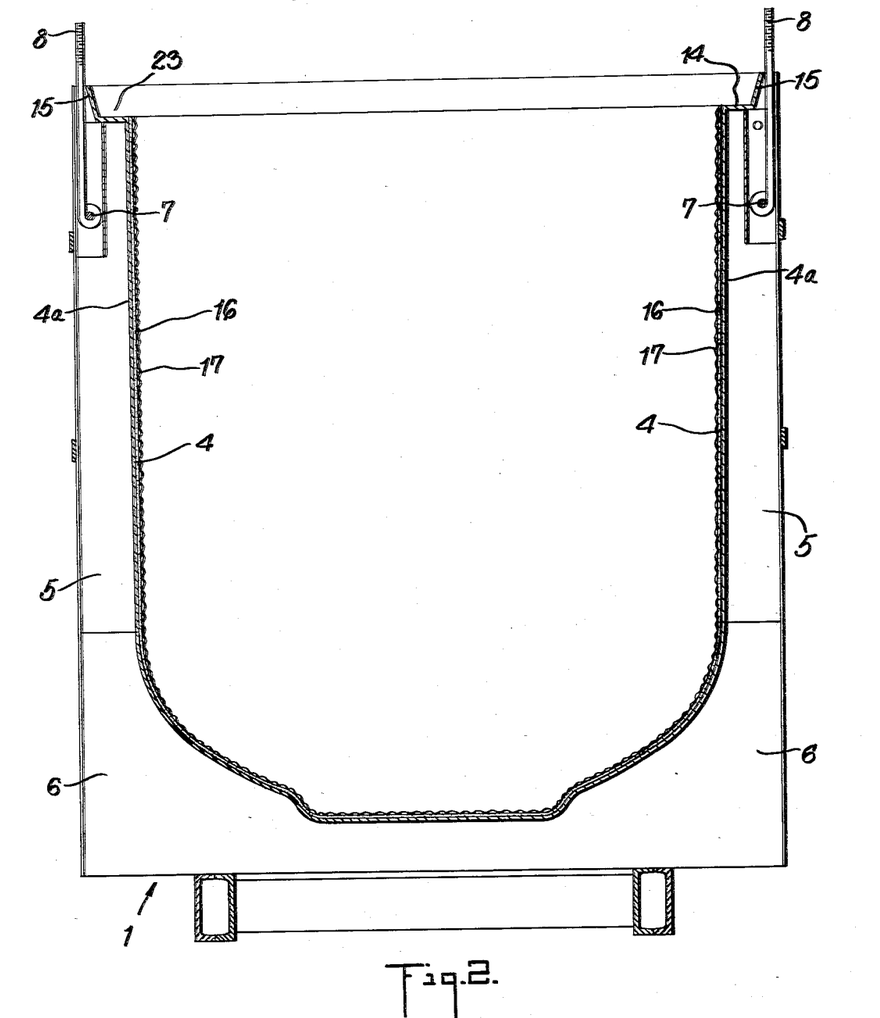
FIG. 2 is a cross section of the lower mold.
Figure 3:
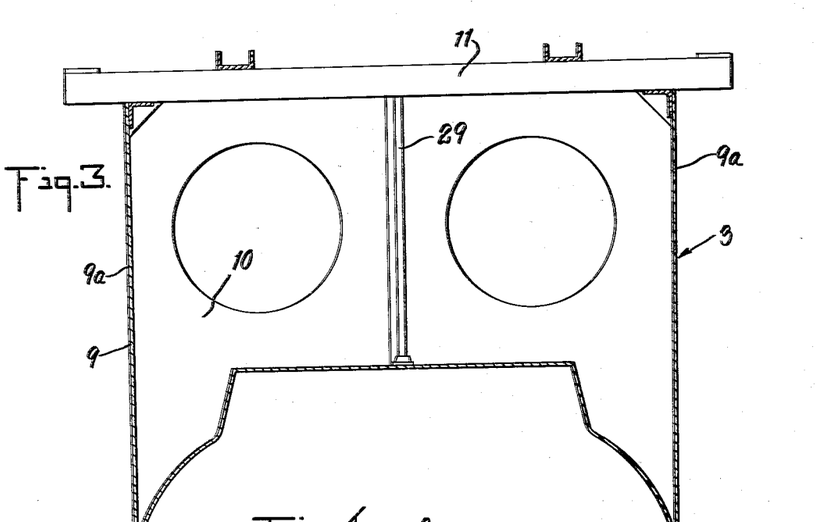
FIG. 3 is a cross section of the upper mold.

In practicing the present invention the inside of the lower mold's skin 4 is first sprayed or otherwise coated with a plastic layer 16 as shown in FIG. 2. At this time the upper mold 3, which may be handled by a crane of suitable size, is free from the lower mold 1 so that men may work within the cavity 2. Ordinarily the entire surface of the skin 4 is coated with this plastic.

Now the idea of this plastic layer 16 is to provide a material which separably adheres to the skin 4 and forms a tacky, sticky or pressure-sensitive adhesive surface. In practice the plastic used has been a polyester resin to which a thixotropic agent was added. It should have a viscosity suitable for forming a thin but distinct layer on the mold's surface. Such a plastic when exposed to air is rather slow to cure because of the action of the oxygen in the air and also because certain components required for hardening evaporate into the air. Because these retarding influences are not present between the plastic layer and the skin 4 the plastic layer tends to harden on the mold's surface while its surface facing the cavity 2 remains tacky or sticky.

Figure 5:
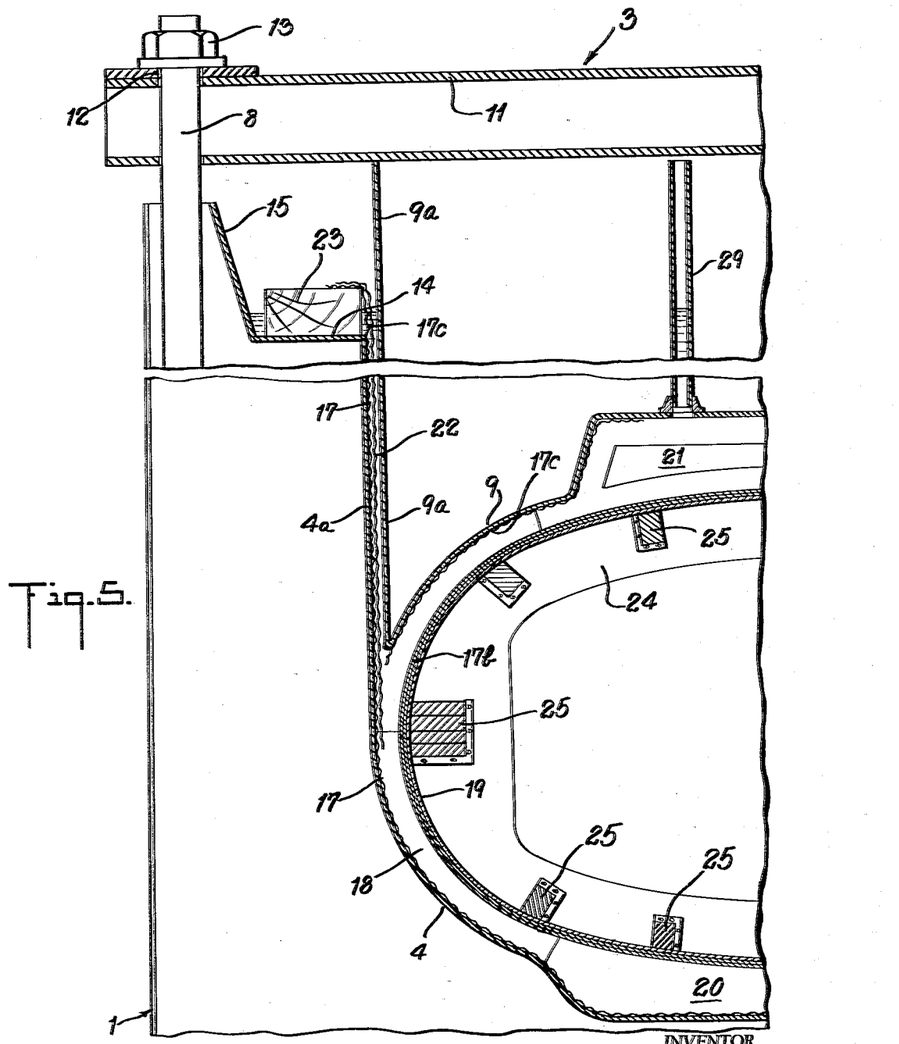
FIG. 5 shows the upper and lower molds closed and with the molding operation in progress.

The next step is to install the porous reinforcing material which in this instance is in the form of cloth woven from fiber glass threads. This installation is performed by in effect wall papering the skin 4 defining the cavity 2. This porous reinforcing layer, shown at 17 in FIG. 5, is pressed lightly but firmly against the tacky surface of the layer 16 so as to completely line the cavity 2. The porous material is applied so that only its outer surface sticks to the tacky plastic layer 16.

In connection with the above, the uncured or tacky portion of the layer 16, and the pressure with which the porous reinforcing material 17 is pushed against the layer 16, should be adjusted or controlled so as to avoid filling or blocking the pores of this reinforcing material. At the same time a firm adhesion between the outer surface of this reinforcing material and the tacky portion of the layer 16 should be effected. The idea is to in effect glue the reinforcing material in position without in any way blocking or filling the pores of the material. It is to be understood that the pores will, of course, be closed where their openings are directly against the plastic layer 16, but they should not be closed to any substantial degree in other directions. At the same time there should be no voids between the interfaces of the reinforcing material and the tacky surface of the plastic layer 16.

Another precaution to be observed is that the porous reinforcing material should not be applied to the plastic layer 16 until the side of the latter contacting the skin 4 has had time to set or harden. Commercially available polyester resins provide an adequate time period following the hardening of the surface next to the skin 4, during which the surface exposed to the air remains tacky. This provides time for the application of the porous reinforcing material and other steps if desired.

Although fiber glass cloth has been described, other reinforcing materials may be used providing they are adequately porous to permit their penetration by a liquid without requiring the use of large hydraulic pressures. For example, in producing the tank being described the fiber glass cloth is used in conjunction with relatively loose fiber glass fibers which are matted together in a more or less loose manner. This fiber glass mat product is commercially available. Such a mat also functions as reinforcing.

In the case of the tank being described the thermal insulation is in the form of balsa wood. Other non-porous but cellular material could be used providing it is a good thermal insulator. It should be non-porous to prevent it from being filled with the plastic. It, of course, need not be cellular although ordinarily most good thermal insulators do contain voids which entrap small masses of static air so as to retard the transfer of heat.

The balsa wood, or other similar solid thermal insulation, must be curved or otherwise shaped to form a layer having the contour demanded by the tank design. This can be done by the use of a suitable jig, the construction of the insulating structure taking place outside of the mold cavity and the structure subsequently being installed in the cavity. However, this is both time consuming and expensive.

Considerable economy can be achieved and accuracy assured by using the lower mold 1 as a jig itself, the balsa wood being curved and fitted together and directly supported by the skin 4 defining the cavity 2. Great accuracy would be required to have the outer surface of the balsa wood fit tightly and without voids at all places against the porous material 17 adhering to the sticky plastic 16. Therefore, the previously described fiber glass mat material is interposed between the balsa wood and the cloth 17. Any elastically deformable material could be used providing it is porous or permeable.

If the fiber glass cloth used has stronger warp strands than its woof strands it is oriented with its warp in line with the tension and compression stresses which the design of the tank indicates are to be expected. This may also be done with the fiber glass mat if it showed directional strength characteristics.

Figure 8:
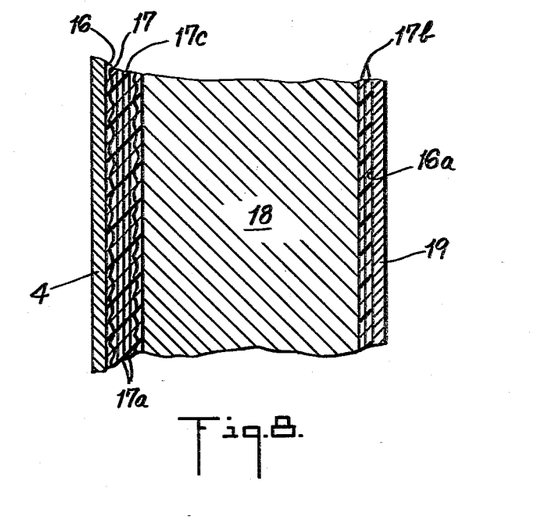
FIG. 8 is a cross section showing the molded reinforced tank wall in detail.

In FIG. 5 the balsa wood layer is indicated at 18, while FIG. 8 serves to show in more detail the reinforcing material 17, which is the fiber glass cloth previously mentioned, the elastically deformable material 17a and the balsa wood 18. In this last figure the material 17 is shown as being adhesively secured to the tacky surface of the plastic layer 16 which is in turn separately adhering to the skin 4 of the lower mold. The elasticity of the fiber glass mat 17a, or comparable material, eliminates any voids between the balsa wood and the skin 4, and as already explained there can be no voids between the fiber glass cloth 17 and the skin 4.

In laying up the balsa wood layer care should be taken not to compact the porous material between it and the skin 4. Balsa wood is light in weight and there is little tendency for it to compact the porous material.

As shown by FIG. 5, a stainless steel tank lining 19 must be located within the balsa wood layer. As health authorities become educated it may be possible to eliminate this lining but it is at present required by law. This stainless steel tank functions as a core and after the balsa wood construction has been made up to about half of the tank's height the tank may be placed in position on this portion of the balsa wood layer. Thereafter, the balsa wood construction is completed so as to completely encircle the tank 19.

Prior to placing the stainless steel tank 19 on the partly completed balsa wood construction, the tank is sprayed or otherwise coated with one of the epoxy resins of the type suitable for this purpose, to form a coating 16a. The coating should have firm adherence with the outside of the stainless steel tank and should be compatible with the plastic used subsequently and described hereinafter. With the tank in place the balsa wood construction 18 may be completed using the upper half of the tank to jig the balsa wood pieces.

As previously explained, it is difficult to curve or form the balsa wood so as to exactly conform with a mating metal wall formation. That is why the elastically deformable porous material 17a is used between the balsa wood and the fiber glass cloth 17 which is adhesively secured to the lower mold's cavity wall. For the same reason, elastically flexible porous material 17b is interposed between the balsa wood 18 and the tank 19. This material is the fiber glass mat material previously described. This mat material should be arranged so that it fills all voids between the balsa wood and the molding walls which includes the tank 19 which functions as a core.

Incidentally, the tank 19 can be replaced by a sectional core construction adapted to be removed completely so as to provide a plastic interior. In such an instance the inside portion of the molding would be made similar to the outside.

As shown by FIG. 5 the trailer truck requires certain structural or decorative parts. This is provided by the balsa wood and fiber glass materials arrangement. The top catwalk support is shown at 20 and the longitudinally extending center sill which reinforces the beam strength of the tank, is shown at 21. The skirt portions are shown at 22, it being understood that these portions need not use thermal insulation and therefore do not include the balsa wood.

The advantage of in effect gluing the reinforcing material in position is particularly evident in the case of these skirts 22. The upper mold is contoured to form the bottom of the tank and then extends upwardly to the beams 11. Both the upper and lower molds have vertical walls 4a and 9a, which are interspaced when the mold assembly is closed, as required to define the tank skirts. Proper positioning of the high wall-like reinforcing material sections would be difficult if fiber glass cloth were not positively positioned by its adherence with the lower mold's cavity wall.

The tank skirts are apt to receive considerable abuse and may be used to mount equipment, so they should be strongly reinforced. Therefore, appropriately shaped wood two-by-fours 23 are laid in the bottoms of the previously described gutter and a layer of the fiber glass cloth 17c is attached to these two-by-fours and hung like a curtain between the walls 4a and 9a. The fiber glass mat material is arranged between the two fiber glass cloth layers so as to provide a cushioning or elastically deformable effect. This matting may also be attached to the wood 23, although other supporting arrangements are possible.

The fiber glass cloth and elastically deformable matting are also draped over the top of balsa wood layer 18 covering the upper portion of the stainless steel tank 19. Gravity alone will serve to position the materials in this instance. However, it may prove to be desirable to also coat the upper mold with the polyester resin providing the tacky surface, and to adhesively secure the outermost fiber glass cloth layer to the upper mold prior to its insertion in the lower mold's cavity.

After the foregoing preparation the upper mold is lowered into the lower mold's cavity so as to define therewith, and with the tank 19, a molding enclosure space. The wall portions 4a and 9a taper slightly so that when the upper mold is fully closed, and assuming proper proportioning of the fiber glass components, compressive pressure is applied to the flexible and elastic porous reinforcing material. Likewise, compressive pressure may be applied to the corresponding components within the portion of the molding enclosure space defined around the tank 19. At all points the fiber glass materials provide a cushioning effect permitting compression of the materials.

During the molding process it may be necessary to apply considerable pressure to close the mold parts fully, depending on the accuracy with which the flexible porous materials and balsa wood components are proportioned. A deficiency of these materials may result in areas which are resin rich or, in other words, which contain only plastic, or too much plastic in relation to the other materials, and, therefore, represent structurally weak areas. Therefore, the tendency is to overproportion the reinforcing materials, especially the elastically deformable fiber glass mat material, since this provides a cushioning effect assuring the absence of the voids.

Because of the high pressure which may be used the tank 19 is internally reinforced by a series of interspaced plywood ribs 24 combined with longitudinally extending wood beams 25. This internal framing is made so that it may be installed and removed from the interior of the tank 19 by working through one of the latter's access openings. Milk transport trailer tanks, and most other similar tanks, are required to have such access openings so that men may enter the tank for the purposes of cleaning and inspection.

Figure 7:
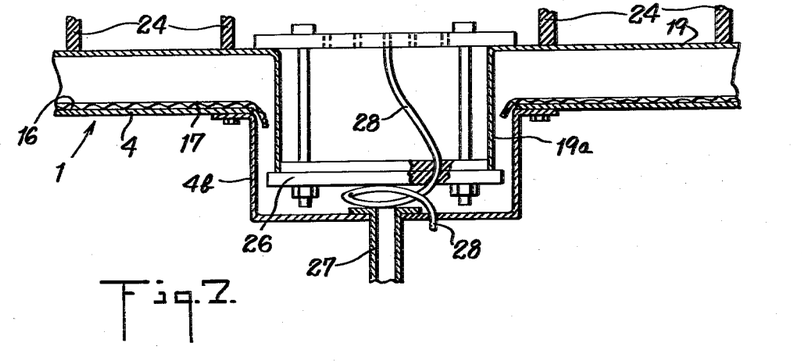
FIG. 7 is a cross section showing the manner in which access openings may be formed in the bottom of the molded tank.

Such access openings must be accommodated by the molding process. One of them is shown by FIG. 7 where the stainless steel tank 19 is provided with a tubular extension 19a. During the molding process the outer end of this tubular extension 19a is closed by an end cap 26, so as to prevent the entrance of the plastic. This access opening is in the top of the tank but since the tank is molded upside down the bottom of the lower mold's skin 4 has an opening through which the extension 19a projects. A metal cap 4b is secured to the skin 4 to provide the latter with a corresponding extension enclosing the extension 19a.

This cap 4b is provided with a plastic inlet 27 because this is a convenient way for carrying the plastic into the molding enclosure at the latter's bottom. A compressed air inlet 28 is shown extending through both the cap 4b and the end cap 26 so that compressed air may be introduced to the interior of the tank 19 if necessary to provide the latter with additional support against collapsing pressures. Water may also be introduced through this inlet 28 if necessary to weight the tank 19 to counteract its natural buoyancy when the plastic is introduced to the molding enclosure.

Now, as explained in the original application, an important feature of the present invention is that prior to the introduction of the liquid plastic to the molding enclosure space containing the porous reinforcing material, the upper mold is not closed fully.

In other words, the upper mold 3 is lowered into the lower mold 1 by a crane to a position known to be at least a little above a position where the molds would apply compression or compacting pressure to the porous reinforcing material. Because the dimensions of these molding components are known it is possible to predetermine the lowermost limit to which the mold 3 may be lowered without compressing the flexible porous material and the elastically deformable material. In actually practicing the present invention the workmen used measuring rules or gauges to fix the position to which the upper mold is lowered by the crane. Positive stops may be used if desired providing the important molding components are arranged in a carefully predetermined manner.

Preferably the upper mold is positioned as close to its closed position as is possible without compression of the reinforcing material. This has the advantage that the molding enclosure space to be filled with plastic is as small as is consistent with the operation of this invention and, therefore, requires the least amount of excess plastic.

Another important feature of the present invention is that the plastic used must be water-thin in consistency. It must, of course, eventually harden, usually effected by catalysts and heat or suitable additives, but initially it just cannot be too high in viscosity. In the actual working of the present invention in the manner illustrated herein the plastic used has the polyester resin sold commercially as MR 28V by the Celanese Corporation of America and having a viscosity of from 50 to 100 cps. However, any plastic may be used providing it is free-flowing in a water-like manner. It should not be thickened appreciably by blending with more viscous materials as is done in the prior art practice of forcibly driving or squirting the plastic through the porous reinforcing material. The plastic used should be compatible with the pastics 16 and 16a pre-coated on the mold cavity wall and tank. Commercially available plastics may be used in all of these instances but the plastics manufacturer should understand the need for the described compatibility and in the case of the plastic 16 the need for providing the tacky or sticky surface.

Now, with the upper mold partly closed as described, and with the porous reinforcing material free from compression so that its inherent pores are unclosed, the free-flowing water-thin plastic is pumped into the molding enclosure through the plastic inlet 27 until the molding enclosure is filled or substantially filled. Control of the filling is effected by the use of a measured volume of plastic or by observation of the level by looking into the space between the upper ends of the walls 4a and 9a. Preferably the upper mold is provided with one or more riser pipes 29 connecting with the portion of the upper mold's skin 9 defining the structural part 21 previously mentioned. This is done in the actual working of the invention and a dip stick is dropped into these pipes to check on the filling of the molding space. These pipes also have the advantage of functioning as air vents located strategically between the wall-like portions defined by the mold portions 4a and 9a and between the downwardly curving portions of the tank form.

Note that while the plastic is being pumped into the molding enclosure space the mold parts are not fully closed. The many passages through the porous material are substantially fully open and the travel of the free-flowing plastic of very light viscosity is unimpeded. This phase of the process is in effect a casting procedure rather than a molding practice.

In the prior art practice of forcibly driving or squirting plastic through the porous material, the theory was that the advancing plastic would drive all air from the porous material. Plastic pressures of up to 300 pounds p.s.i. wer contemplated. Several pounds of pressure, 10 pounds p.s.i. being required in one instance, were necessary to move the plastic through the rinforcing material. This was because the reinforcing material received the pressure of the mold parts so that its naturally porous nature was substantially reduced in permeability. This pressure was required to prevent displacement of the porous material by the hydraulic action of the plastic. The processing was such as to suggest to the prior art the desirability of even further thickening the plastic, up to 75 percent of a filler such as asbestos, wood flour, clay, whiting and the like having been suggested.

Contrary to the above in the present process the liquid is maintained at atmospheric pressure. The only pressure on the liquid plastic is the hydrostatic head resulting from the height of the product being molded. The porous material is so open to the passage of the liquid plastic and the latter is of such low viscosity as to permit the liquid plastic to be flowed gravitationally into the molding enclosure space. When pumped in there is no back pressure.

Due to the above factors there is no tendency for the free-flowing plastic to push aside or disarrange the porous reinforcing material from the place where it was placed carefully by the workman. Arrangements of the material for the purpose of providing the best resistance to stresses and strains is not affected in any appreciable manner.

Also, because the porous materials are uncompressed, impregnation can be accomplished with great speed.

Another mode of completing the filling of the molding enclosure space suggested by the original application is to place a measured quantity of the liquid plastic in the mold cavity and to then lower the upper mold into the cavity until a location is reached where the mold assembly is partially or almost completely closed but which does not apply a pressure to the porous material used for reinforcing or other purposes. This is operative although the pumping procedure has proven more practical in the case of very large objects such as a trailer tank.

The above procedure is also to be distinguished from the prior art practice which was similar in a general way but which involved the use of a viscous or deliberately thickened plastic which was hydraulically driven or squirted with considerable hydraulic pressure through the porous material. In this prior art practice the mold assembly was closed with a uniform movement so that the upper mold pressed against and anchored the porous material against displacement while at the same time squeezing this material so that the upper mold functioned like a piston in a pump cylinder to develop the hydraulic pressure. In doing this the porous material was continuously rendered less porous by the descending upper mold so that with increasing hydraulic pressure a corresponding decrease in porosity resulted. In suggestions relating to this prior art practice reference are to be found suggesting the use of 10 to 15 pounds p.s.i. on up to as much as 300 pounds p.s.i. These pressures were used for impregnating and if no pressure was required for curing it was necessary after impregnation to release the applied pressure, this in and of itself promoting the formation of voids.

By the present invention a mold enclosure of the size illustrated can be filled in about ten minutes more or less. A catalyst and a promoter are added to the polyester resin to cause it to ultimately harden and possibly the mold assembly may be heated as by blowing hot air on it for the purpose of assisting in the hardening. These are added in such small percentages as not to change materially the viscosity. Small amounts of pigment may be added for coloring and here again the amount used should not materially increase the light viscosity of the plastic required by the practice of the present invention. The plastic composition is adjusted to effect hardening of the plastic in from 4 to 8 hours in the actual working of the precent process.

In any event the plastic should not set too promptly or quickly after being cast into the molding enclosure space. As the prior art tried to do with the more viscous plastics, the free-flowing water-thin plastic used in the case of the present process does tend to drive air from the porous material. However, it is impossible under commercial conditions to obtain a uniform flow rate throughout a molding enclosure space as large as that shown by the drawings. Although the plastic flows freely and without substantial hindrance its rate of flow may be retarded for undetermined reasons. One such reason might be an uneven arrangement of the balsa wood, or possibly air may cling to the fibers of the material through which the plastic is flowed.

Because of the above a waiting period is involved. During this time period the free-flowing plastic has an opportunity to gradually dislodge air which was not dislodged initially even though only the hydrostatic pressure of the plastic is available as a dislodging force. During this time period lateral flow of plastic is possible as the water-thin plastic seeks out and enters every void.

The extent of this waiting period, prior to any further closing of the mold parts, may be determined in many instances by observation of the visible upper surfaces of the liquid plastic. Sometimes after casting the liquid plastic remains quiet and gives no evidence of air evolution, at other times after a period of quiet air bubbles appear, and sometimes there is an immediate frothing which drives the plastic further upward and into the previously described gutter. The mold parts should not be closed fully so as to substantially fully compress the porous material until after all signs of air evolution have safely passed.

In some instances the time required for the plastic to become quiescent is very short and at other times a relatively long time interval is necessary. The time must be long enough to permit the liquid to penetrate fully into all portions of the molding enclosure space which are not filled by solid materials.

It is to be understood that there must be suitable passages between the inner and outer surfaces of the balsa wood component to permit the liquid plastic to flow freely on both sides of this inherently impermeable material.

During this waiting period the bolts 8 are placed in operative positions and the nuts 13 are pulled partly down. These nuts may be tightened manually by workmen working on a platform 5a supported up in the air by the tension members 5. The workmen may tend to start tightening the nuts 13 one after the other and a little at a time even before the mold assembly should be fully closed. This is all right providing they do not work so rapidly as to start to compress the porous material too soon.

When the liquid plastic is completely quiet the workmen gradually tighten the nuts so as to force the upper mold 3 downwardly to its fully closed position. This position is predetermined as being sufficient to exert at least slight compression on all of the elastically deformable porous material and as bringing the tank wall thickness and other measurements to the specified final dimensions. The taper of the wall portions 4a and 9a are such that the pressure is applied between them also.

The final closing of the mold is, of course, slow enough to avoid surges of the plastic which might disarrange the predetermined arrangement of the reinforcing and thermal insulating components. The manual tightening of the nuts 13 one after another forces this degree of slowness on the workmen.

Forcing of the upper mold to its fully closed position reduces the volume of the molding enclosure space, compacts the porous material so as to increase its volume with respect to the volume of plastic, and thereby produces a final molding having a predetermined ratio between plastic volume and the volume of the other components. This is done so that the plastic volume is reduced to the lowest possible amount whereby the finished structure has the great strength of the fiber glass reinforcing with as little as possible of the weakness inherent to plastic.

The reduction in the volume of the molding enclosure space drives the still free-flowing and water-thin liquid plastic very slowly upwardly and into the previously mentioned gutter. The flat bottom 14 of this gutter is transversely open to this plastic. The water-thin plastic easily flows under the wood members 23 since they cannot seal tightly with the gutter's bottom 14.

Now this gutter use is another important feature of this process. As the fiber glass mat, or similar material, compresses it does so unevenly in some instances. In other words its density varies. As the plastic is driven upwardly it moves slowly through the paths of least resistance so as to overflow at those areas over the flat gutter bottom 14. With time it has been found that the plastic tends not only to remain adjacent to the area from which it was displaced but also tends to flow reversely over the flat gutter bottom 14 back to the areas from which it came. This is important because the plastic, therefore, flows back through the paths of least flow resistance during the entire period required for setting or hardening of the plastic. The gutter acts as a riser but in addition tends to restrain or hold the displaced plastic right at the location where its feed-back is most effective. The pipes 29 also function as risers since the liquid plastic is forced upwardly in them also from the upper part of the molded space, and this plastic is also available for feed-back purposes at all times during the hardening time. However, it is in the relatively thin sections such as the parts between the wall portions 4a and 9a that the localized feed-back action is most important.

It might be noticed that the tank 19 rests directly on the materials beneath it during the introduction of the liquid plastic. This tank is made of very thin gauge stainless steel since it actually is a stainless steel lining rather than a tank by itself. The wood bracing within it is also of relatively light weight. Furthermore, the weight of these parts is spread over a very large area so that the pressure per square inch is extremely light.

The buoyancy of the liquid plastic tends to float the tank upwardly but as previously indicated should this create appreciable pressure upwardly on the material above the tank during the described waiting or quieting period, the tank may be ballasted with water introduced through the inlet 28. In fact, when difficult conditions are encountered the tank may be made to partly float in the plastic in what might be called a weightless condition free from upward force.

After the 4 to 8 hours hardening time, the mold assembly is ready to be opened. This is done by releasing the nuts 13 and using the crane to lift the upper mold free. This requires breaking of the bond between the plastic 16 and the upper mold surface. This has been done by the use of hydraulic jacks positioned between the upper and lower molds, the crane being used to remove the upper mold after the jacks have broken the grip between the parts.

When the molding is removed its exterior will have the smoothness of the lower mold's skin 4 because the outer surface area of the plastic 16 was hard when the fiber glass cloth 17 was pressed against the tacky surface of this plastic 16. Therefore, the contour or pattern of this porous reinforcing material does not protrude or in effect print through so as to be visible on the outside of the plastic 16, to any great extent.

Freedom from resin rich areas is, of course, positively insured against for the reasons previously described. Furthermore, the porous reinforcing material is entirely free from voids, because all of the available pores or passages were fully open when the water-thin plastic flowed through them during the casting phase. Furthermore, the waiting time or period permitting the evolution or driving off of any air occluded in the porous materials even though the only fluid pressure available was the hydrostatic head of the liquid plastic itself.

Note that if the evolution of the air created a boiling effect driving plastic from the area, that any such plastic driven upwardly from the molding enclosure was caught by the gutter, retained locally by the peculiar effect inherent to the flat horizontal gutter bottom, and ultimately fed back to the area from which it came. This action may occur during the waiting period.

The above feed-back action likewise occurred after the mold was closed fully so as to reduce the molding enclosure space, compress the porous material and thereby to drive the water-thin plastic upwardly. Normally a slight excess of plastic is used so that with full closing of the mold parts the excess runs into the gutter where it is constantly available for feed-back purposes during all of the time the plastic remains liquid.

Although the foregoing actions and effects obtain thorough and complete impregnation or permeation of all of the pores, openings and passages in the reinforcing material, it is to be noted that the pressures and flow rates were at all times substantially negligible when compared to the prior art practices in general. This is why destructive sectioning of the ultimate molding for examination purposes will always reveal the fiber glass cloth and the fiber glass mat oriented, located and arranged substantially exactly as done by the workmen initially in accord with predetermined designing aimed at obtaining maximum strength at the locations and in the directions needed.

The complexity with which the reinforcing materials must be arranged to meet extreme structural design requirements in the case of the illustrated tank construction, is highlighted by FIG. 6. Here the pattern of the parts arrangement is shown with the components expanded or separated from each other for the purpose of identification. It is the kind of lay-out drawing used to guide the workmen when practicing the present invention.

Referring to this FIG. 6, it can be seen that the components include the previously mentioned fiber glass cloth 17, indicated by a wavy line, the fiber glass mat 17a, indicated by the non-wavy lines, and the fiber glass mats 17b and 17c. All of these have been discussed previously.

Obviously a truck trailer tank of this size receives severe stressing when placed in service. A number of these trailer tanks have been operating for a substantial period of time without using any longitudinal structural members and relying solely on their inherent beam strength. So far none of these has shown any serious faults and it is, therefore, safe to conclude now that they are fully successful.

As shown by FIG. 6, in the tanks built so far many other layers of the fiber glass cloth and fiber glass mat are used. Throughout this figure the cloth is shown by the wavy lines and the mat is shown by the non-wavy lines. This is, of course, a schematic showing.

Note that the mat 17b is in the form of a plurality of layers, each comprising a mat wide enough to more than encircle the tank 19. This tank is laid on the center lines of these mats and the latter are then folded or wrapped completely around the tank with their side portions overlapping extensively.

At the catwalk location (see FIG. 5) there are a large number of alternate layers of the cloth and mat in the form of relatively narrow strips with their side portions overlapped by the components 17 and 17a. Similarly arranged layers of cloth and mat provide additional encirclements for the balsa wood components.

The cloth 17c terminates at locations adjacent to the tank form, and the skirts include additional cloth and mat layers, these overlapping with a large number of layers of such material in the form of strips extending along the center sill portion of the tank. It can be seen that these contribute great beam strength to the trailer tank so that the latter does not require metal beams or the like when in service. The catwalk portion adds to this strength.

The members 23 are used to hang the porous reinforcing material other than for the outermost layer 17. Should it be wondered why it is so important to prevent the formation of resin rich areas in the case of fiber glass cloth layer 17 it is best to explain that this is the outermost layer. Resin rich areas tend to form surface cracks or crazing which detracts greatly from the appearance of the construction. The use of the tacky or sticky plastic, previously described, avoids this difficulty. The lack of strength promoting this surface defect may not be serious structurally speaking and, therefore, the wall papering technique previously described is not used excepting where appearance is important. However, its great convenience might indicate its use elsewhere such as in connection with the upper mold.

The complexity of the reinforcing required by this tank, and the thermal insulation, emphasizes the value of the present invention inherent to its lack of any tendency concerning washing of the reinforcing components. In this art washing means the trouble experienced by the prior art practices when the reinforcing components are literally washed from their positions by the flow of plastic under considerable pressure or moving at high velocity due to rapid and continuous closing of the molds.

It is to be understood that the molding process of this invention may be used in what appear to be much simpler forms. For example, it may be desired to produce a flat panel which might be used for a door, for example. In such an instance obviously no core would be used. However, the steps of casting the water-thin plastic while the porous reinforcing material is in an uncompressed condition, the waiting period required to obtain stable conditions, the gutter technique for effecting feed-back of displaced plastic, and the final full or complete closing of the mold parts to apply at least light compression to the porous material, can all be used and will work together to produce an excellent molding all as previously described.

In producing a refrigerator truck body the parts required mainly are in effect a flat panel for the floor and an open-bottomed inverted tank structure. In this instance the inverted tank structure when molded would be in the form of an open-topped container of adequate size as required to provide the dimensions of such a relatively large structure. No metal liner or tank or equivalent chamber forming core is involved. The upper mold cooperates with the cavity of the lower mold to define the molding enclosure space and by moving the upper mold up and down the volume of this space may be varied. The high walls make the previously described wall papering technique very advantageous and to assure a smooth interior this technique may be applied to the upper mold also. The mold parts are, of course, kept slightly open during the casting or quieting or stabilizing waiting period and the upper mold is thereafter forced downwardly so as to compress the elastic porous material and to bring the wall thickness to the dimension required by the design specifications. This also obtains the predetermined ratio between the volumes of reinforcing material and the plastic and, of course, also the balsa wood or other thermal insulation which might be used. This latter component is ordinarily of a non-porous type as previously described but is in any event a part of the overall wall structure.

Although the molding of such panel and open-topped tank parts are not illustrated separately by the drawings, it can be seen that in effect they are shown. The tank skirts are in effect panels and the overall process required to form the tank shown is comparable to the making of any tank even though in other instances there may be fewer complications.

In connection with the above, the skirts have been cut off and used for the fabrication of chemical containing tanks, when not needed by the trailer tank. They are structurally sound and strong.

Figure 4:
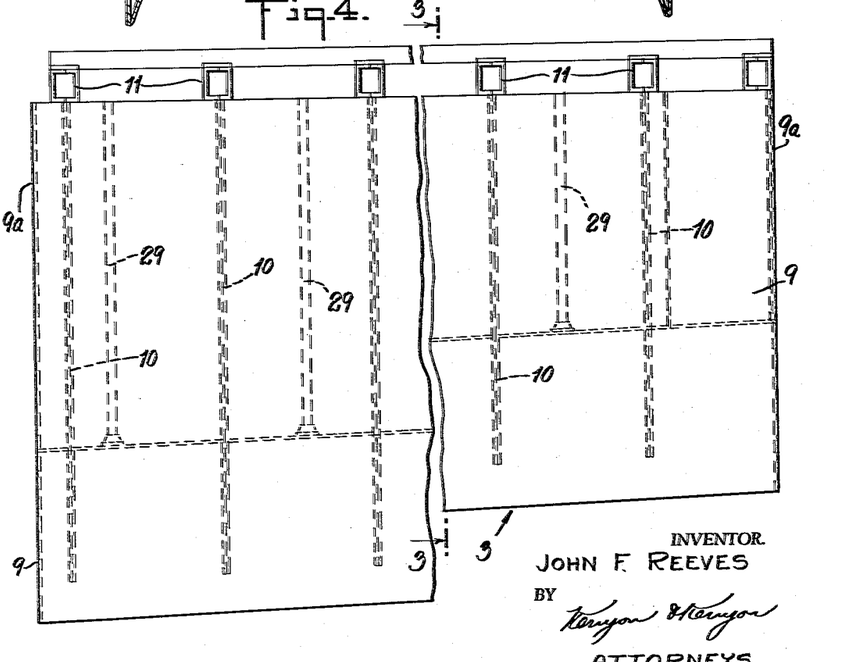
FIG. 4 is a side elevation of the upper mold, broken to compact the necessarily very long mold into the permissible space.

In FIG. 4 it can be seen that the trailer tank is made with a sloping bottom, the top being mounted horizontal when in use. This is easy to make with the described molding process but is very difficult and expensive to construct from metal because then every metal frame or rib, required to reinforce the two skins, must be of a different size from the others. A sloping bottom tank is very useful because it rides more stably and drains better than one having a horizontal bottom.

The bolts 8 and nuts 13 have worked satisfactorily. However, other means may be used for fully closing the mold assembly, such as hydraulic means or the like.

With the molds open as they are when the plastic is introduced to the space they define, the uncompressed porous material permits the liquid plastic, when thin as described, to flow through it freely. Thus the material may be quickly impregnated and because there is little resistance to the plastic flow there is little tendency for washing away the porous material even if a relatively high plastic flow rate is used.

Should the porous material be carelessly used there may be pinched-off or inherently tight or compressed areas even when the molds are not fully closed. The water-thin consistency of the plastic and the waiting period let the plastic impregnate even such areas and, of couse, there is the constant supply of plastic available, for impregnating such area, in the skirt portions of the molding enclosure. These portions have this value even if not required by the tank design, and they are themselves continuously supplied with plastic forced into the gutter and free to flow back to the skirt portions.

Although reinforcing has been referred to herein, the porous material might be used primarily to locate the balsa wood or other similar core material during the casting and subsequent hardening of the plastic. For example, such material may be used between the abutting portions of the balsa wood or the like to form passages for the plastic flow to the inner faces of such impermeable core material.

Reference has been made to the effect of gluing the fiber glass cloth or other porous material to the mold surface to avoid voids therebetween. Actually the plastic layer or coating used for this purpose hardens almost throughout except for its thin skin portion exposed to the air which remains tacky indefinitely. It is almost impossible to push the porous material deeply into this layer so as to close the porous material's pores or to permit its pattern to show on the side next to the mold. The effect is one of surface adhesion only, which remains active until the subsequently cast plastic hardens. However, the plastic is elastic and sometimes shrinks enough so that the resulting internal pressure causes a slight cloth pattern to appear on the outer surface of the molding. This has never happened in a seriously objectionable manner.

This adhesion of the porous material to the mold surface is of particular advantage at locations where curves or the like cause the material to tend to bridge the concave or indented mold surface. The practice under discussion eliminates such bridging. On vertical surfaces it prevents the material from tending to hang with folds like a loose curtain would.

Fiber glass mat is difficult to describe but is commercially available. The fibers are matted together in an open or loose manner. Incidentally reference has been made to air being displaced by the plastic from this material and from the cloth or other porous material. The term air is to be understood as including any gas or gases in this connection.

One way to curve the balsa wood is to bend panels of the wood and adhere fiber glass cloth firmly to the concave sides of the curved panels to prevent them from springing back to their originally flat form. Using this practice the wood is formed into what might be termed building blocks which as a collection form the tank contour. This is why a jig is required and by using the mold and stainless steel tank liner, with appropriate interleaving of the porous material, a separate jig is made unnecessary and time is saved.

When the epoxy resin is coated on this stainless steel liner tank it should not be fully cured or hard when the polyester resin is cast into contact with it. Alternately it may be fully cured and slightly roughened to effect a firm bonding with the polyester resin. The use of other plastic combinations might eliminate the need for such precautions.

The curing time for the cast plastic may, of course, vary providing the requirements of the present invention are observed.

Use of the tacky plastic is valuable with other products for the purpose of causing reinforcing or other flexible material to adhere to the mold surface to avoid voids between the material and the mold surface. Plastics prevented from curing by being in contact with the air tend to stay tacky for a long time. The effect must last until the cast plastic hardens.

When the skirt or comparable design is used the same mold assembly may be used to make different sizes of tanks or the like. The upper mold is merely moved to different closing locations as required and different cores, as represented here by the stainless steel tank, may be used.

The process of adhering the fiber glass cloth or similar porous material to the mold's inside surface, described hereinabove, has an additional advantage of great practical importance. This advantage is that when other porous or other material tends to bridge a concave or re-entrant mold surface portion to which the cloth or other material is adhered so it cannot bridge, trouble from gas entrapment within the plastic located between the bridging and adhering materials is largely eliminated. Apparently the gas can escape through the adhering layer of porous material, or perhaps some other kind of action is involved. In any event, the result is a practical elimination of such gas and the bubble-like voids it creates in the plastic, and this result is of importance.

I claim:

1. A process for molding in a mold assembly having a lower mold forming an upwardly open cavity and a movable upper mold which may be inserted and moved downwardly into said cavity to a predetermined final closed position defining a molding enclosure space having interspaced wall-like portions extending upwardly and opening to the atmosphere, said process including placing molding components including flexible compressible porous material into said cavity, moving said upper mold into said cavity to confine said porous material, stopping said movement of the upper mold at a first position which is slightly above final closed position to substantially avoid compression of said porous material, thereafter filling said space with a free flowing liquid plastic, allowing said plastic liquid to seek its own level by gravity in said space to fill said space and impregnate said porous material, and maintaining said upper mold at said first position until said filling has been substantially completed, and then moving said upper mold to a second position which is said final closed position where said space is reduced in volume, and allowing said plastic to harden.

2. A process for molding in a mold assembly having a lower mold forming an upwardly open cavity and a movable upper mold which may be inserted and moved downwardly into said cavity to a predetermined final closed position defining a molding enclosure space having interspaced wall-like portions extending upwardly and opening to the atmosphere, said process including placing molding components including flexible compressible porous material into said cavity, moving said upper mold into said cavity to confine said porous material, stopping said movement of the upper mold at a first position which is slightly above final closed position to substantially avoid compression of said porous material, thereafter filling said space with a free flowing liquid plastic, allowing said plastic liquid to seek its own level by gravity in said space to fill said space and impregnate said porous material, and maintaining said upper mold at said first position until said filling has been substantially completed, and then moving said upper mold to a second position which is said final closed position where said space is reduced in volume sufficiently to compress said porous material, and allowing said plastic to harden.

3. A process for molding in a mold assembly having a lower mold forming an upwardly open cavity and a movable upper mold which may be inserted and moved downwardly into said cavity to a predetermined final closed position defining a molding enclosure space having interspaced wall-like portions extending upwardly and opening to the atmosphere, said process including placing molding components including flexible compressible porous material into said cavity, moving said upper mold into said cavity to confine said porous material, stopping said movement of the upper mold at a first position which is slightly above final closed position to substantially avoid compression of said porous material, thereafter filling said space with a free flowing liquid plastic, allowing said plastic liquid to seek its own level by gravity in said space to fill said space and impregnate said porous material, collecting plastic liquid which overflows said space, allowing said collected liquid to feed back by gravity to fill all voids, and mantaining said upper mold at said first position until said filling has been substantially completed, and then moving said upper mold to a second position which is said final closed position where said space is reduced in volume, and allowing said plastic to harden.

4. A process for molding in a mold assembly having a lower mold forming an upwardly open cavity and a movable upper mold which may be inserted and moved downwardly into said cavity to a final closed position defining a molding enclosure space having interspaced wall-like portions extending upwardly and opening to the atmosphere, said process including placing flexible compressible porous material into said cavity, preparing a multiplicity of pieces of light weight filler material to fit the shape of the cavity, laying a layer of said filler material pieces in the cavity on said compressible porous material while providing passages between the inner and outer surfaces of said filler material, moving said upper mold into said cavity to confine said porous material and filler material, stopping said movement of the upper mold at a first position which is slightly above final closed position to substantially avoid compression of said porous material and filler material, thereafter filling said space with a free flowing liquid plastic, allowing said plastic material to seek its own level by gravity in said space to fill said space and flow through said passages to be on both sides of said filler material, and maintaining said upper mold at said first position until said filling has been substantially completed, and then moving said upper mold to a second position which is a final closed position where said space is reduced in volume, and allowing said plastic to harden.

5. A process for molding in a mold assembly having a lower mold forming an upwardly open cavity and a movable upper mold which may be inserted and moved downwardly into said cavity to a final closed position, said upper mold having a concave lower portion to co-act with the cavity of the lower mold in said final position, said process including placing flexible compressible porous material into said cavity of the lower mold, placing a core element in said cavity on said porous material, draping flexible compressible porous material on top of said core, moving said upper mold into said cavity of said lower mold with its concave bottom cooperating in shape with the top of said draped core to provide a molding enclosure space open to the atmosphere completely around said core, stopping said movement of the upper mold at a first position which is slightly above final closed position to substantially avoid compression of said porous material, thereafter filling said space with a free flowing liquid plastic, allowing said plastic material to seek its own level by gravity in said molding space to fill said space and flow through said filler material passages to be on both sides of said filler material, maintaining said upper mold at said first position until said filling has been substantially completed, then moving said upper mold to a second position which is a final closed position where said space is reduced in volume, and allowing said plastic to harden.

6. A process for molding in a mold assembly having a lower mold forming an upwardly open cavity and a movable upper mold which may be inserted and moved downwardly into said cavity to a final closed position, said upper mold having a concave lower portion to co-act with the cavity of the lower mold in said final position, said process including placing flexible compressible porous material into said cavity of the lower mold, preparing a multiplicity of pieces of light weight insulating material to fit the shape of the cavity, laying a layer of said insulating material pieces in said cavity of the lower mold on said compressible porous material while providing passages between the inner and outer surfaces of said insulating material, placing a core element of said cavity on said insulating material, draping flexible compressible porous material on top of said core, placing pieces of said light weight insulating material on top of said porous material and core while providing passages between the inner and outer surfaces of said insulating material, moving said upper mold into said cavity of said lower mold with its concave bottom cooperating in shape with the top of said draped core to provide a molding enclosure space open to the atmosphere completely around said core, stopping said movement of the upper mold at a first position which is slightly above final closed position to substantially avoid compression of said porous material, thereafter filling said space with a free flowing liquid plastic, allowing said plastic material to seek its own level by gravity in said molding space to fill said space and flow through said filler material passages to be on both sides of said filler material, maintaining said upper mold at said first position until said filling has been substantially completed, then moving said upper mold to a second position which is a final closed position where said space is reduced in volume, and allowing said plastic to harden.

7. A process for molding in a mold assembly having a lower mold forming an upwardly open cavity and a movable upper mold which may be inserted and moved downwardly into said cavity to a predetermined final closed position defining a molding enclosure space having interspaced wall-like portions extending upwardly and opening to the atmosphere, said process including coating one of the cooperating surfaces of one of said molds with a coating layer of a type having a tacky, pressure-sensitive exposed surface after setting, allowing said coating to set, applying porous flexible material to said tacky surface by pressure so that only the contacting surface of the porous material adheres to said coating, loosely placing other molding components including flexible compressible porous material into the cavity between said molds, moving said upper mold into said cavity to confine said porous material, stopping said movement of the upper mold at a first position which is slightly above final closed position to substantially avoid compression of said porous material, thereafter filling said space with a free flowing liquid plastic, allowing said plastic liquid to seek its own level by gravity in said space to fill said space and impregnate said porous material, and maintaining said upper mold at said first position until said filling has been substantially completed, and then moving said upper mold to a second position which is said final closed position where said space is reduced in volume, and allowing said plastic to harden.

References Cited in the file of this patent

UNITED STATES PATENTS

| | | |
|---|---|---|
| 490,459 | Straus | Jan. 24, 1893 |
| 1,221,450 | Hitchcock | Apr. 3, 1917 |
| 2,414,125 | Rheinfrank | Jan. 14, 1947 |
| 2,441,097 | Hicks | May 4, 1948 |
| 2,478,165 | Collins | Aug. 2, 1949 |
| 2,495,640 | Muskat | Jan. 24, 1950 |
| 2,541,297 | Sampson et al. | Feb. 13, 1951 |
| 2,576,864 | Valente | Nov. 27, 1951 |
| 2,613,397 | Borkland | Oct. 14, 1952 |
| 2,746,049 | Hudson | May 22, 1956 |
| 2,751,626 | Lyijynen et al. | June 26, 1956 |
| 2,813,050 | Hickson | Nov. 12, 1957 |
| 2,905,578 | Rees et al. | Sept. 22, 1959 |